United States Patent [19]

Cotter et al.

[11] Patent Number: 4,684,067

[45] Date of Patent: Aug. 4, 1987

[54] TWO-STAGE, HYDRAULIC-ASSISTED FUEL INJECTION NOZZLE

[75] Inventors: David H. Cotter, Coopersville; Richard F. Teerman, Wyoming; Robert C. Timmer, Grandville, all of Mich.

[73] Assignee: General Motors Corporation, Detroit, Mich.

[21] Appl. No.: 842,553

[22] Filed: Mar. 21, 1986

[51] Int. Cl.⁴ ............................................. F02M 45/00
[52] U.S. Cl. .................................. 239/533.3; 123/467; 137/489.5; 239/533.8
[58] Field of Search ...................... 239/88-96, 239/533.3-533.12, 585, 583; 137/489.5; 123/461, 506

[56] References Cited

U.S. PATENT DOCUMENTS

| | | | |
|---|---|---|---|
| 3,910,503 | 10/1975 | Barber | 239/96 X |
| 3,997,117 | 12/1976 | Kohler et al. | 239/533.8 |
| 4,269,360 | 5/1981 | Kopse | 239/533.8 |
| 4,403,740 | 9/1983 | Eblen et al. | 239/553.2 |
| 4,448,356 | 5/1984 | Nakajima et al. | 239/533.5 |
| 4,475,515 | 10/1984 | Mowbray | 239/88 X |
| 4,573,433 | 2/1986 | Deckard | 239/88 |
| 4,594,097 | 10/1985 | Aoki et al. | 239/533.3 X |
| 4,598,863 | 7/1986 | Kunesaka | 239/96 |

Primary Examiner—Andres Kashnikow
Assistant Examiner—Kevin Patrick Weldon
Attorney, Agent, or Firm—Arthur N. Krein

[57] ABSTRACT

A fuel injection nozzle is provided with a pressure actuated injection valve with a first spring and a second spring operatively associated therewith to permit two stage opening of the injection valve, these spring also controlling opening movement of a valve during the injection cycle in the mid to higher speed range of engine operation to allow pressurized fuel to act on the stem end of the injection valve to effect its closure at a higher valve closing pressure than the valve closing pressure from idle to a predetermined mid-speed range of engine operation.

3 Claims, 2 Drawing Figures

TWO-STAGE, HYDRAULIC-ASSISTED FUEL INJECTION NOZZLE

FIELD OF THE INVENTION

This invention relates to fuel injection nozzles as used in diesel engines and, in particular, to a two-stage, hydraulic-assisted fuel injection nozzle.

DESCRIPTION OF THE PRIOR ART

The desirability of controlling the valve lift of a diesel fuel injection nozzle in two stages so as to provide for a first stage, as for pilot injection or for an idle engine mode of operation, during which a limited quantity of fuel is injected into the combustion chamber with which the injection nozzle is associated and then to provide for a second stage so as to increase the quantity of fuel to be injected into the combustion chamber as engine speed increases has been recognized. Various arrangements have been proposed to accomplish such two stage injection as, for example, by the use of two springs of different bias forces as disclosed, for example, in U.S. Pat. No. 4,448,356 entitled "Double-Injection Type Fuel Injection Valve" issued May 15, 1984 to Nakajima et al or by the use of two springs and a control piston as disclosed, for example, in U.S. Pat. No. 4,403,740 entitled "Fuel Injection Nozzle", issued Sept. 13, 1983 to Eblen et al.

In diesel fuel injection nozzles of the type using a conventional pressure actuated needle valve, the valve opening pressure (VOP) is normally greater than the valve closing pressure (VCP). Thus under normal operation of a standard pressure actuated needle valve type fuel injection nozzle for a particular diesel engine application, the needle valve can be set to open at a valve opening pressure (VOP) of 3500 psi and to close at a valve closing pressure (VCP) of approximately 2800 psi. However, it is also realized that any fuel injected at relatively low pressure, such as pressures below 3500 psi down to 2800 psi, during high speed engine operation is not adequately injected for complete atomization due to combustion chamber pressures so as to be completely consumed during the combustion cycle for that injection period.

SUMMARY OF THE INVENTION

The present invention relates to a two-stage, hydraulic-assisted diesel fuel injection nozzle of the type having an injection valve of the pressure actuated needle valve type controlling discharge flow from the spray tip end of the nozzle, with the needle valve being normally biased to a valve closed position by a first preset lower-load spring, the needle valve also being operatively associated with a second high-load spring, whereby the valve will be opened in two stages, as the first low-load spring force is overcome and then the second spring force is overcome by the pressure of fuel supplied to the downstream end of the needle valve, the spring cages housing these springs also being adapted to be supplied with pressurized fuel via a valve controlled orifice passage and one of the spring cages having a drain flow orifice for the drain flow of fuel from the spring cages to a source of low pressure fuel, so that hydraulic fuel pressure can act on the needle valve whereby the valve closing pressure (VCP) can be increased, as desired, to a value substantially greater than the valve opening pressure (VOP), so as to effect a reduction in the duration of injection from approximately a mid-range to high-speed operation, which will eliminate pressure blow-back, reduce smoke, and improve overall engine operation efficiency.

It is therefore a primary object of this invention to provide an improved diesel fuel injection nozzle wherein a pair of valve springs are used to effect the two-stage opening of a pressure actuated needle type injection valve and wherein hydraulic pressurized fuel during engine operation at higher speed ranges is supplied at a controlled rate to the stem side of the needle valve whereby the injection valve can be closed at a preselected high valve closing pressure that is higher than the valve opening pressure.

For a better understanding of the invention as well as other objects and further features thereof, reference is made to the following detailed description of the invention to be read in connection with the accompanying drawings.

DESCRIPTION OF THE EMBODIMENTS OF THE INVENTION

Figure 1:
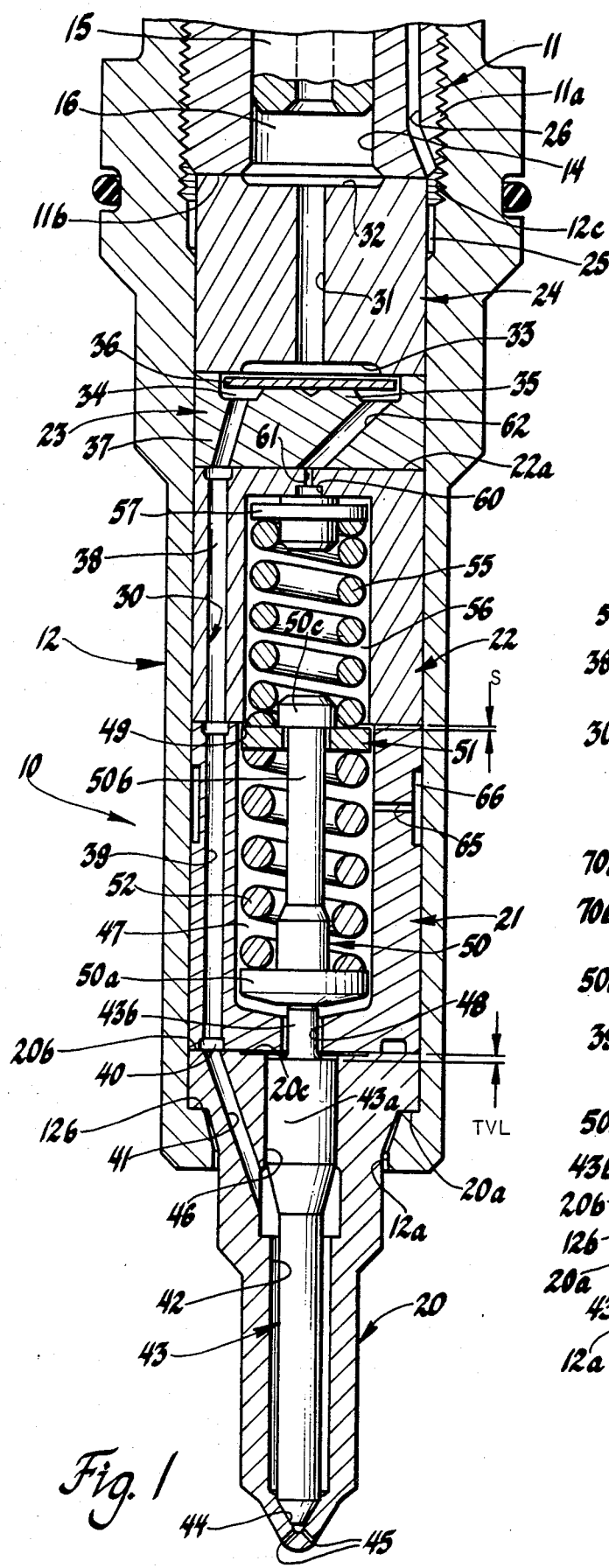
FIG. 1 is a longitudinal cross-sectional view of a diesel fuel injection nozzle in accordance with a preferred embodiment of the invention incorporated into an electromagnetic unit fuel injector, with parts shown in elevation; and, FIG. 2 is a cross-sectional view of a portion of a diesel fuel injection nozzle in accordance with an alternate embodiment of the invention.

Referring first to FIG. 1 there is shown a preferred embodiment of a two-stage, hydraulic-assisted fuel injection nozzle, generally designated 10, in accordance with the invention, which for purpose of illustration only, is shown as being incorporated into a conventional electromagnetic unit fuel injector, only a portion of which is illustrated. The electromagnetic unit fuel injector, for example, may be of the general type disclosed in U.S. Pat. No. 4,392,612 issued July 12, 1983 to John I. Deckard and Robert D. Straub or, as disclosed in U.S. Pat. No. 4,540,122 issued Sept. 10, 1985 to Richard F. Teerman, the disclosures of which are incorporated herein by reference thereto.

In the construction illustrated, the electromagnetic unit fuel injector has an injector housing that includes an injector pump body 11 and a nozzle nut 12 that is threaded to the lower end of the injector body 11 to form an extension thereof. The injector pump body 11 is provided with a stepped bore that defines at the lower end thereof a cylindrical wall or bushing 14 to slidably receive a pump plunger 15 that is externally actuated in a conventional manner, not shown, whereby the pump plunger 15 can be reciprocated through a suction stroke and a pump stroke. The pump plunger 15 together with the bushing 14 defines a variable volume pump chamber 16 at the lower open end of the bushing 14.

The nozzle nut 12 has an opening 12a at its lower end through which extends the lower end of a combined injector valve body or spray tip 20, hereinafter referred to as the spray tip 20. As shown, the spray tip 20 is enlarged at its upper end to provide a shoulder 20a which seats on an internal shoulder 12b provided by the through counterbore in nozzle nut 12.

Between the spray tip 20 and the lower end of the injector pump body 11, in the embodiment shown in FIG. 1, there is positioned, in sequence starting from the spray tip 20, a first spring cage 21, a second spring cage 22, an inlet member 23 and an inlet director cage 24, these elements being formed as separate elements for ease of manufacturing and assembly. Nozzle nut 12 is provided with internal threads 12c for mating engagement with the external threads 11a at the lower end of the injector pump body 11. The threaded connection on the nozzle nut 12 to the injector pump body 11 holds the spray tip 20, first and second spring cages 21, 22 respectively, inlet member 23 and inlet director cage 24 clamped and stacked end-to-end between the upper surface 20b of the spray tip 20 and the bottom surface 11b of the injector pump body 11. All of the above-described elements preferably have lapped mating surfaces whereby they are held in pressure sealed relationship to each other. In addition, a predetermined angular orientation of the first and second spring cages 21, 22, respectively and the inlet member 23 with respect to each other is maintained in a conventional manner, as well known in the art by means of dowel or alignment pins, not shown.

While a relatively close fit exists between the inner peripheral wall of the nozzle nut 12 and the outer peripheral surface of the first and second spring cages 21, 22, respectively, inlet member 23 and the lower portion of the inlet director cage 24, as is conventional, there is a predetermined diametral clearance between these parts for the venting of fuel back to a relatively low pressure area. In a particular application and for a purpose to become apparent hereinafter, this diametral clearance provides a flow area of 0.54 square mm.

In the construction illustrated, this fuel is drained into a cavity 25, defined by the internal wall of the nozzle nut 12 and the upper outer peripheral surface of the inlet director cage 24, and from this cavity 25, fuel is returned to a drain outlet passage, not shown, via a drain passage 26 provided for this purpose in the lower end of the injector body 11.

During operation, on a pump stroke of plunger 15, when fuel is adapted to be pressurized it is adapted to be discharged from pump chamber 16 into the inlet end of a discharge passage means 30 to be described next hereinafter.

An upper part of this discharge passage means 30, with reference to FIG. 1, includes a vertical passage 31 extending from an upper recess 32 through inlet director cage 24 for flow communication with an annular recess 33 provided in the lower surface of the inlet director cage 24.

As shown in FIG. 1, the inlet member 23 is provided with an enlarged chamber 34 formed therein so as to face the recess 33 and, projecting upwardly from the bottom of the chamber 34 is a protuberance 35 which forms a stop for a circular flat disc check valve 36. The chamber 34 extends laterally beyond the extremities of the opening defining recess 33 whereby the lower end surface of the inlet director cage 24 will form a seat for the check valve 36 when in a position to close the opening defined by recess 33.

At least one inclined passage 37 is also provided in the inlet member 23 to connect the chamber 34 with a longitudinal passage 38 that extends through the second spring cage 22 for flow communication with a longitudinal passage 39 extending through the first spring cage 21 so as to open into an annular groove 40 provided in the lower end of the first spring cage 21. The lower groove 40 is, in turn, connected by at least one inclined passage 41 to a central passage 42 surrounding a needle type injection valve 43 movably positioned within the spray tip 20. At the lower end of passage 42 is an outlet for fuel delivery with an encircling annular conical valve seat 44 for the injection valve 43 and, below the valve seat 44 are connecting spray orifices 45 in the lower end of the spray tip 20.

The upper end of spray tip 20 is provided with a bore 46 for guiding opening and closing movement of the injection valve 43. The piston portion 43a of the injection valve slidably fits this bore 46 and has its lower end exposed to fuel pressure in passage 42 and its upper end exposed to fuel pressure in a first spring chamber 47 via an opening 48, both being formed in first spring cage 21 by a stepped bore, the upper portion thereof having an internal diameter that is greater than the enlarged diameter portion of the stepped bore in the second spring cage 22 whereby the lower surface of cage 22 defines an annular abutment shoulder 49. A reduced diameter upper end portion 43b of the injection valve 43 extends through the central opening 48 in the first spring cage and abuts a first spring seat, generally designated 50.

In the preferred embodiment shown in FIG. 1, and as a feature of the invention, the first spring seat 50 includes a lower flange seat 50a having a shank 50b extending upward therefrom for a predetermined axial extent to terminate at an upper head 50c. Compressed between the flange seat 50a of the first spring seat 50 and a slotted spring retainer 51 loosely encircling the shank 50b for abutment against the upper head 50c is a first coil spring 52, of a predetermined force, which is operative, in cooperation with a second coil spring 55 to be described, to normally bias the injection valve 43 to its closed position shown.

With the injection valve 43 in its closed position shown in FIG. 1, a predetermined gap TVL (total valve lift) exists between the upper free surface of the piston portion 43a thereof and the lower opposing surface of the first spring cage 21, the upper surface of the spray tip being provided with an annular recessed cavity 20c encircling the upper end of this piston portion 43a. In addition, a predetermined gap S, for pilot injection, exists between the upper surface of the slotted spring retainer 51 and the annular shoulder 49. In a particular application, the TVL gap for total valve lift was 0.012 inch while the gap S for pilot injection was 0.004 inch.

In addition, a second coil spring 55 of a predetermined force less than that of the first coil spring 52 is operatively positioned in the spring cavity 56 of the second spring cage 22 so that its lower one end abuts against the slotted spring retainer 51 while its opposite or upper end abuts against a disc valve 57 to normally bias this disc valve 57 into a position blocking flow through a passage means 60 having a flow control orifice 61 thereabove of predetermined cross-sectional flow area opening centrally through the base portion 22a of the second spring cage 22. This flow orifice 61 and passage means 60 being adapted to receive pressurized fuel during a pump stroke of the plunger 15 via an inclined passage 62 provided in the inlet member 23 so as to be in flow communication at one end with the flow orifice 61 and at its opposite end with the chamber 34.

As should now be apparent, the spring chambers 47 and 56 which are, in effect, in direct flow communication with each other define a spring chamber means 47, 56 to control fuel pressure in this spring chamber means 47, 56, that normally contains trapped fuel. The first spring cage 21 is provided, in the construction shown, with a radial vent orifice passage 65 of predetermined cross-sectional flow area so as to extend through the wall thereof to open into an annular groove 66 provided in the outer peripheral surface of the first spring cage 21 that is thus in flow communication with the diametral clearance previously described.

In the particular application, previously referred to, the flow orifices 61 and 65 were each of 0.15 mm diameter so as to provide for a cross-sectional flow area of 0.018 square mm through each of these flow orifices. Thus drain flow from the spring chamber means 47, 56 is, in effect, controlled by the flow orifice 65 since its flow area is substantially less than the diametral clearance flow area between the inner peripheral surface of the nozzle nut 12 and the outer peripheral surface of the first and second spring cages 21 and 22, the inlet element 23 and the inlet director cage 24 as previously described. In addition, the passage 60 for the particular application referred to was formed with an internal diameter of 1.64 mm so that with a predetermined spring force applied to the disc valve 57, this valve will open as the fuel pressure during injection reaches approximately 8000 psi. This pressure, in the engine and injection nozzle application referred to occurs near or slightly above the speed range of engine operation.

Also in the particular application referred to hereinabove, the force of the low-force second spring 55 was preselected so that the needle type injection valve 43 would open at a valve opening pressure (VOP) of 2000 psi and would normally close at a valve closing pressure (VCP) of 1600 psi. In said application, the forces of the 52 and 55 were selected so that further opening movement of the injection valve 43 will begin to occur at a pump injection pressure output of 5000 psi, with increased valve lift to a maximum of 0.012 occurring as injection pressure reaches a predetermined maximum value.

FUNCTIONAL DESCRIPTION

Before describing the functioning operation of the subject two-stage, hydraulic-assisted fuel injection nozzle 10 of the preferred embodiment of the subject invention as shown in FIG. 1, a brief description of the process for injecting fuel into the cylinder of a direct injected type diesel engine is deemed necessary for a complete understanding of the operation of the subject fuel injection nozzle.

In such a direct injection type diesel engine, fuel at a relatively low pressure, for example at a pressure of approximately 2000 psi can be injected into an associate cylinder effectively during the start of an injection cycle, starting at the idle speed mode of operation and up through the high speed mode of engine operation, since the start of injection is normally set to occur at, for example, between 10°-5°, depending on the engine application, before the associate piston on its compression stroke reaches top dead center (TDC).

Such a low valve opening pressure provides for a reduced variability of the plural injectors used in an engine, thus improving idle quality. In addition, in a direct injection diesel engine, lower injection pressures are preferred so as to reduce idle combustion noise.

As well known in such an engine, the time interval during which fuel is injected into the cylinder will vary as a function of engine speed such that, for example, during idle speed operation the fuel injection cycle can extend through approximately only 5° of crankshaft rotation whereas at high speeds the injection cycle can extend through approximately 30° of crankshaft rotation.

It is also well known in the art, that as engine speed increases as from idle up to a high speed mode of operation, the time period during which the fuel that is being injected into the cylinder can burn progressively decreases due to the increase in operating speed of the engine. Also, because of the discharge flow rate through the injector spray orifices, such as spray orifices 45, is controlled by the number and sizes of such orifices, and because as engine speed increases an increase in the speed of the pump plunger on its pump stroke also increases. The result is a corresponding increase in the injection discharge pressure developed by the pump, with maximum pressures reaching, for example, 15,000 psi to 25,000 psi, depending on the particular injection pump and engine application being used.

Assuming now that the subject injection nozzle assembly 10 is full of fuel and that the pump plunger 15 is moving downward on a pump stroke and that drain flow from the pump chamber 16 has been blocked, the pressure of fuel in the pump chamber 16 and in the discharge passages in flow communication therewith will be substantially increased. As this fuel discharge pressure increases, the needle valve 43 will lift, against the bias force of the low force spring 55 at a valve opening pressure of 2000 psi, a predetermined amount S, that is 0.004 inches, which is the axial extent through which the slotted retainer 51 can move before it comes into abutment against the shoulder 49 in the construction illustrated. In the particular embodiment shown, and as used in a particular engine application, this will be the maximum lift of the injection valve 43 from an idle mode of engine operation up through a predetermined mid-speed range of engine operation.

Accordingly, through this predetermined range of engine operation, the end of injection will occur as the drain flow from the pump chamber 16 is initiated in a suitable manner as disclosed, for example in the above-identified U.S. Pat. Nos. 4,392,612 and 4,540,122 to permit injection pressure to decrease with the injection valve 43 then closing at a valve closing pressure of 1600 psi. Such a low terminal injection pressure can be tolerated during this relatively low speed mode of engine operation because any such low pressure fuel injected into the cylinder at the end of an injection cycle will have a relatively long time interval in which to burn completely.

Now as engine speed increases slightly over the previously identified mid-speed range, the increased speed of operation of the pump plunger 15 will be such so as to increase the injection pressure to a value of over 8000 psi. As this occurs the flow of this high pressure fuel through the flow orifices 61 into passage 60 will effect unseating of disc valve 57 so as to allow the pressure of fuel in the spring chamber means 47, 56 to reach a pressure value so as to effect a substantial pressure balance on the injection valve 43 so that when the injection cycle begins to be terminated, as by permitting the drain flow of fuel from the pump chamber 16 to sources of low pressure fuel in the manner, for example, as described hereinabove, the injection valve 43 will be moved to the closed position shown in FIG. 1 at a valve closing pressure (VCP) of approximately 8000 psi.

Thus also, as the speed of the engine further increases, so will the speed of the pump plunger increase resulting in the injection pressures to increase accordingly. Thus at higher engine speeds, the injection pressure will rise substantially so that additional lift of the injection valve 43 will begin to occur as the fuel pressure in the passage 42 acting on the injection valve 43 reaches, for example, 5000 psi in the particular nozzle application being referred to herein, so as to overcome the bias force of the springs 55 and 52 and as injection pressures increase further beyond this pressure level additional valve lift will occur as up to a total valve lift (TVL) of 0.012 inch in the particular application referred to at the maximum high speed operation of the engine, that is, when injection pressure, in this particular application, reaches a maximum pressure of approximately 15,000 psi.

Referring again to the hydraulic-assisted valve closing feature of the invention, it should now be appreciated that by increasing the valve closing pressure of the injection valve 43, which normally has a lower valve closing pressure than its valve opening pressure at all engine speeds as described, during the upper speed range of engine operation, the hydraulic-assisted closing of the injection valve 43 will, in effect, reduce the duration period of fuel injection, which in turn, will eliminate cylinder blow back, reduce smoke and improve overall engine operating efficiency. Otherwise if fuel is injected into the combustion chamber at a relatively low pressure at the end of an injection cycle while the engine is operating above a predetermined speed for a particular engine this low pressure fuel injected near the end of an injection cycle cannot effect proper penetration into the combustion chamber so as to be fully burned therein during the reduced time interval at which the combustion process occurs during the upper speed mode range of engine operation.

Thus by terminating fuel injection at a relatively high injection pressure above a preselected speed of engine operation, fuel injected at this high pressure will attain sufficient penetration so as to permit combustion thereof.

Figure 2:
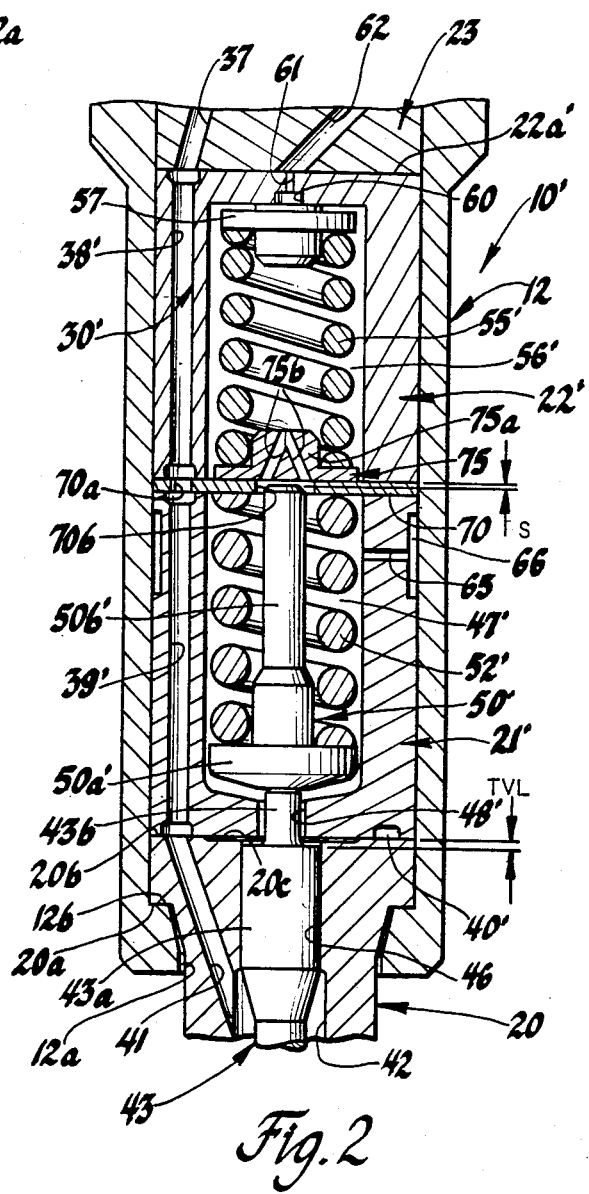

An alternate embodiment of a two-stage, hydraulic-assist fuel injection nozzle, generally designated 10', in accordance with the invention is shown in FIG. 2, wherein similar parts are designated by similar numerals, but with the addition of a prime (') where appropriate.

In this alternate embodiment, a circular, disc spring retainer 70 is sandwiched between the first spring cage 21' and the second spring cage 22' with a suitable clearance between its outer peripheral surface and the inner peripheral surface of the nozzle nut 12. As shown in FIG. 2, the disc spring retainer 70 is provided with a passage 70a to effect flow communication between the passages 39' and 38' in the first and second spring cages 21' and 22', respectively, thus forming part of the discharge passage means 30' of this nozzle assembly. In addition the disc spring retainer 70 is provided with a central aperture 70b of a suitably large internal diameter for a purpose to be described.

In this alternate embodiment shown in FIG. 2, the first spring seat 50' includes a lower flange seat 50a' with a shank 50b' extending upward therefrom for a predetermined axial extent. The upper free end of this shank 50b' has an external diameter whereby it will be loosely received through the aperture 70b in the disc spring retainer 70. Thus, in this embodiment, the first coil spring 52', of a predetermined force, has one end thereof engaging the flange seat 50a' of the first spring seat 50' while its opposite end abuts against the disc spring retainer 70 to normally bias the needle valve 43 to its closed position.

In this alternate embodiment, the second coil spring 55' which in this embodiment is of a predetermined force greater than the force of the first coil spring 52' is loosely received in the spring cavity 56' in the second spring cage 22' whereby one end thereof, the lower end with reference to FIG. 2, abuts against a second spring retainer 75 that is provided with a central upstanding boss 75a to effect centering of the spring 55', while its opposite or upper end abuts against the disc valve 57 to normally bias this disc valve 57 to a position so as to block fluid flow through the passage means 60 and the flow control orifice 61 provided in the center of the base portion 22a' of the second spring cage 22'. Also, as shown, the boss 75a of this spring retainer 75 is provided with a plurality of inclined passages 75b to effect free flow communication between the spring cavities 56' and 47', the bottom end of these passages 75b opening into the aperture 70b of the disc spring retainer 70 outward of the free end of shank 51b' of the first spring retainer, it being noted that the spring retainer 75 is normally biased into abutment against the upper surface of the disc spring retainer 70, the position shown in FIG. 2.

As illustrated in FIG. 2, the axial extent of the shank 50b' of the first spring seat 50' and the axial position of the disc spring retainer 70 are preselected so that with the needle valve 43 in its closed position, a predetermined gap S, of, for example, 0.004 inch, exists between the upper free end surface of the shank 50b' and the lower face of the second spring retainer 75. In the same manner, as described with reference to the FIG. 1 embodiment, a predetermined total valve lift gap (TVL) is also provided for in the alternate embodiment between the upper free surface of the piston portion 43a of the needle valve 43 and the lower opposing surface of the first spring cage 21'.

Assuming that the spring forces and the valve 57 opening force in this alternate embodiment injection nozzle 10' are the same as described with reference to the FIG. 1 embodiment, this injection nozzle 10' will operate in the same manner described with reference to the injection nozzle 10, except that in the FIG. 2 embodiment, initial injection valve 43 lift is limited by the abutment of the shank 50b' of the first spring retainer 50' against the lower surface of the second spring retainer 75. However, as injection pressures increases to 9000 psi and above, the injection valve 43 will move upward carrying the first spring seat 50' with it thus causing corresponding upward movement of the second spring retainer 75 against the bias force.

It will be appreciated by those skilled in the art that the bias forces of the two springs can be selected as desired to provide for initial injection opening at a desired valve opening pressure and additional valve opening at any desired higher pressure and that the valve 57 controlling the hydraulic-assist valve closing feature can be designed so as to open at any predetermined pressure as desired, either by controlling the bias force of the associated spring(s) or by increasing the flow area of the orifice 61 in the constructions illustrated.

Accordingly, while the invention has been described with reference to the structures disclosed herein, it is not confined to the specific details set forth, since it is apparent that many modifications and changes can be made by those skilled in the art. This application is therefore intended to cover such modifications or changes as may come within the purposes of the improvements or scope of the following claims.

The embodiments of the invention in which an exclusive property or privilege is claimed are defined as follows:

1. A fuel injection nozzle for internal combustion engines including, in combination, a nozzle body means having a fuel inlet means at one end thereof and a fuel injection spray orifice means at its opposite spray outlet end with a discharge passage means interconnecting said inlet means to said spray orifice means; a valve seat in said passage means upstream of said spray orifice means, a spring chamber means in said nozzle body means intermediate said ends, a pressure actuated injection valve in said nozzle body movable relative to said valve seat and having one end thereof extending into said spring chamber means, a first spring means and second spring means in said spring chamber means operatively connected to each other and to said injection valve to effect the opening of said injection valve in two stages is controlled by said first spring means and said second spring means with a first stage opening as controlled by said first spring and a second stage opening as controlled by both said first and second springs, a valve controlled orifice passage means in flow communication at one end with said discharge passage means and at its opposite end with said spring chamber means, said valve controlled passage means including an orifice passage and an enlarged passage, a valve means associated with said enlarged passage portion of said valve controlled orifice passage means and normally biased by one of said spring means so as to block flow through said orifice passage means; and, a drain orifice passage means in flow communication at one end with said spring chamber means and connectable at its opposite end to a source of low pressure fuel, said valve means being operative to open at a predetermined pressure whereby pressurized fluid entering said spring chamber means will act on said injection valve to effect closing of said injection valve at a predetermined valve closing pressure substantially higher than said valve opening pressure.

2. A fuel injection nozzle for internal combustion engines including, in combination, a nozzle body means having a fuel inlet means at one end thereof and a fuel injection, spray orifice means at its opposite spray outlet end with a discharge passage means interconnecting said inlet means to said spray orifice means; a spring chamber means in said nozzle body means intermediate said ends, a valve seat in said passage means upstream of said spray orifice means, a pressure actuated injection valve in said nozzle body movable relative to said valve seat and having one end thereof extending into said spring chamber means, a first and second spring means in said spring chamber means operatively connected to each other and to said injection valve, said first spring means being of a force so as to control the initial opening of said injection valve at a first predetermined valve opening pressure, said second spring means being of a force so as to be operative to control the further opening movement of said injection valve at a second predetermined fuel pressure, a valve controlled passage means having a flow control orifice therein in flow communication at one end with said discharge passage means and at its opposite end with said spring chamber means, said valve controlled passage means including a valve means associated with said passage means downstream of said flow control orifice and normally biased by one of said spring means so as to block flow through said orifice passage means; and, a drain orifice passage means in flow communication at one end with said spring chamber means and connectable at its opposite end to a source of low pressure fuel, said valve means being operative to open at a predetermined pressure whereby pressurized fluid entering said spring chamber means will act on said injection valve to effect closing of said injection valve at a predetermined valve closing pressure substantially higher than said valve opening pressure.

3. A fuel injection nozzle for internal combustion engines including, in combination, a nozzle body means having a fuel inlet means at one end thereof and a fuel injection, spray orifice means at its opposite spray outlet end with a discharge passage means interconnecting said inlet means to said spray orifice means; a valve seat in said passage means upstream of said spray orifice means; a spring chamber means in said nozzle body means intermediate said ends, a pressure actuated injection valve in said nozzle body movable relative to said valve seat and having one end thereof extending into said spring chamber means, a first and second spring means in said spring chamber means operatively connected to each other and to said injection valve, said first spring means being of a force so as to control the initial opening of said injection valve at a first predetermined valve opening pressure, said second spring means being of a force so as to be operative to control the further opening movement of said injection valve at a second predetermined fuel pressure, a valve controlled orifice passage means in flow communication at one end with said discharge passage means and at its opposite end with said spring chamber means, said valve controlled passage means including a valve means associated with the orifice passage portion of said valve controlled orifice passage means and normally biased by one of said spring means so as to block flow through said orifice passage means up to a predetermined pressure of fuel in said discharge passage means; and, a drain orifice passage means in flow communication at one end with said spring chamber means and connectable at its opposite end to a source of low pressure fuel, said valve means being operative to open at a predetermined pressure whereby pressurized fluid entering said spring chamber means will act on said injection valve to effect closing of said injection valve at a predetermined valve closing pressure substantially higher than said valve opening pressure.

* * * * *